United States Patent
Clauss et al.

[15] 3,689,486
[45] Sept. 5, 1972

[54] 3,4-DIHYDRO-1,2,3-OXATHIAZIN-4-ONES AND THEIR PREPARATION

[72] Inventors: Karl Clauss, Eppenhain, Taunus; Harald Jensen, Frankfurt am Main, both of Germany

[73] Assignee: Farbwerke Hoechst Aktiengesellschaft vormals Meister Lucius & Bruning, Frankfurt am Main, Germany

[22] Filed: Jan. 7, 1971

[21] Appl. No.: 104,795

[30] Foreign Application Priority Data

Jan. 10, 1970 Germany..........P 20 01 017.7

[52] U.S. Cl..............260/243 R, 99/141 A, 260/543
[51] Int. Cl. ..............................................C07d 95/00
[58] Field of Search..................................260/243 R

[56] References Cited

UNITED STATES PATENTS 3,317,523    5/1967    Wright......................260/243

Primary Examiner—John M. Ford
Attorney—Curtis, Morris & Safford

[57] ABSTRACT

3,4-Dihydro-1,2,3-oxathiazinones, a new class of chemical compounds having a ring system being hitherto unknown, are obtained when reacting fluoro sulfonyl isocyanates with keto-compounds of alkynes. The compounds having low-molecular substituents are artificial sweetening agents and the derivatives having hydrophobic substituents are interfacial active agents. All of the new compounds are organic intermediates having a plurality of reactive groups.

11 Claims, No Drawings

3,4-DIHYDRO-1,2,3-OXATHIAZIN-4-ONES AND THEIR PREPARATION

The present invention provides new compounds which derive from the ring system of the 3,4-dihydro-1,2,3-oxathiazin-4-one unknown until now, as well as processes for their preparation.

The new compounds correspond in the form of the free acid to the general formula I

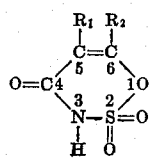

in which $R_1$ represents a hydrogen atom, an optionally branched alkyl group having from one to 20, preferably up to 10, carbon atoms, an aromatic hydrocarbon radical having up to 10 carbon atoms, or an aliphatic acyl radical having from two to four carbon atoms, $R_2$ stands for an optionally branched alkyl group having up to 20, preferably up to 10 carbon atoms, or an aromatic hydrocarbon radical having up to 10 carbon atoms, and in which $R_1$ and $R_2$ may also be linked to form an isocyclic ring which optionally may be substituted by further hydrocarbon radicals. Subject of the present invention are also the salts of the compounds of formula I.

The new 3,4-dihydro-1,2,3-oxathiazinones are prepared by treating β-ketocarboxylic acid amide-N-sulfone derivatives of the general formula II

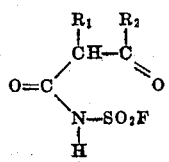

in which $R_1$ and $R_2$ are as defined above, with bases in the presence of water, so that the mixture attains a pH of 5 to 12, and isolating the oxathiazinone of the formula I thus obtained.

The β-ketocarboxylic acid amide-N-sulfone derivative of the formula II can be obtained according to different processes, which comprise reacting a compound of the general formula $$R_1—A—R_2 \quad \text{III.}$$

in which $R_1$ and $R_2$ are as defined above and A represents a group of the formulas

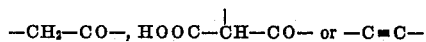

with fluorosulfonyl isocyanate of the formula IV $$O = C = N—SO_2 \quad \text{IV.}$$

which is hereinafter designated as "FSI".

The different processes for the preparation of the β-ketocarboxylic acid amide-N-sulfofluorides of the formula II are characterized in that either A. ketones of the general formula V $$R_3—CH_2—CO—R_2 \quad \text{V.}$$

in which $R_3$ represents a hydrogen atom, an optionally branched alkyl radical having from one to 20 carbon atoms or an aromatic hydrocarbon radical having up to 10 carbon atoms, $R_2$ stands for an optionally branched alkyl group having from one to 20 carbon atoms or an aromatic hydrocarbon radical having up to 10 carbon atoms, and in which $R_3$ and $R_2$ may be linked to form an isocyclic ring which optionally may be substituted by further hydrocarbon radicals, are reacted with FSI, the β-ketocarboxylic acid amide-N-sulfofluorides obtained are treated at pH 5 to 12 with water with addition of bases, and the oxathiazinones of formula I obtained are isolated from the solution; or B. β-ketocarboxylic acids of the general formula VI $$HOOC—CH—CO—R_2 \quad \text{(VI)}$$

(with $R_3$ substituent)

in which $R_3$ and $R_2$ are as defined above, are reacted with FSI, the β-ketocarboxylic acid amide-N-sulfofluorides obtained while $CO_2$ is split off, are treated at pH 5 to 12 with water with addition of bases, and the oxathiazinones of the formula I obtained are isolated from the solution, or C. β-diketones of the general formula VII $$R_4—CO—CH_2—CO—R_2 \quad \text{VII.}$$

in which $R_2$ is as defined above and $R_4$ stands for an alkyl radical having from one to three carbon atoms, are reacted with FSI, the α-[N-fluoro-sulfonyl-carbamoyl]-β-diketones obtained are treated at pH 7 to 14 with water with addition of bases, and the oxathiazinone of the general formula VIII

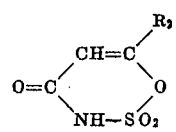

in which $R_2$ is as defined above, optionally together with a portion of the non-deacylated precursor of the general formula

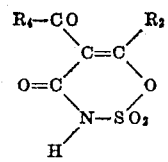

in which $R_2$ and $R_4$ are as defined above, is separated, or

D. alkynes of the general formula X $$R_3—C \equiv C—R_2 \quad \text{X.}$$

in which $R_3$ and $R_2$ are as defined above, but $R_3$ preferably represents a hydrogen atom or an alkyl radical having from one to four carbon atoms and $R_2$ preferably stands for an alkyl radical having from one to four carbon atoms, are reacted with two mols of FSI, the uracil derivatives obtained of the general formula XI

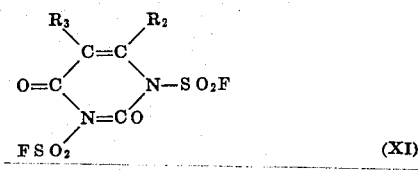

are treated with water, the β-ketocarboxylic acid amide-N-sulfofluorides of the general formula XII

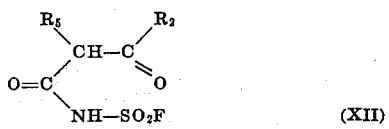

obtained are reacted at pH 5 to 12 with water with addition of bases, and the oxathiazinone of formula I obtained is separated from the solution.

The new oxathiazinone derivatives are prepared via the intermediate products mentioned, i.e., the substituted β-ketocarboxylic acid amide-N-sulfofluorides, which are converted into the oxathiazinones either as pure compounds or in the form of the reaction mixtures obtained in their synthesis, by means of bases in the presence of water, as shown in the following equation:

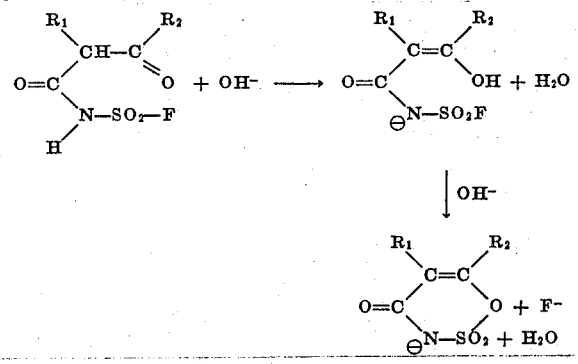

This reaction is surprising, since the S-F-bond which generally cannot be hydrolyzed is split already at slightly elevated temperature and in the vicinity of the neutral point.

The anions of the β-ketocarbamido-N-sulfofluorides obtained as primary products dissolve in the aqueous reaction medium. Also after the subsequent cyclization, the oxathiazinones in the form of their salts remain dissolved in the reaction medium, as far as bases containing suitable cations are used.

According to the reaction equation, 2 equivalents of base per mol of β-ketocarbamido-N-sulfofluoride are required. However, an excess of base is not detrimental because of the stability of the oxathiazinone ring to alkaline hydrolysis.

The base to be used may widely vary in its nature; it only must be sufficiently basic and water-soluble in order to attain a pH of from 5 to 12, preferably of from 7 to 9, in the mixture. Aqueous alkaline solutions, for example sodium hydroxide solution or potassium hydroxide solution are to be preferred, but sodium carbonate solution, sodium bicarbonate, milk of lime, ammonia or water-soluble organic bases, for example alkylamines, triethanolamine or pyridine may also be used. The base may either be first introduced into the reaction vessel or added to the saponification components during the reaction. It is advantageous to feed in half of the amount of base totally required in the first place and then to add the remaining half in accordance with the course of the cyclization, i.e. while maintaining a pH of from 5 to 12, preferably of from 7 to 9.

Although the reaction in an aqueous solution is to be preferred, the presence of water-miscible solvents and diluents or solvents and diluents non-miscible with water is not detrimental. Their presence may even be advantageous in case the β-ketocarbamido-N-sulfofluoride is not used in its pure isolated form, but in the form of the reaction mixture obtained when it has been prepared. Also in water-miscible solvents, the anion of the β-ketocarbamido-N-sulfofluoride is migrating into the aqueous layer.

Saponification and ring formation proceed rapidly and completely between about +5° and about +85° C, preferably between +20° and +50° C. The optimum temperature as to reaction speed and heat requirements depends on the substituents $R_1$ and $R_2$.

Isolation of the oxathiazinones from the aqueous solution of their salts is carried out according to known processes. Derivatives sparingly soluble in water are precipitated by acidification with for example hydrochloric, sulfuric or sulfurous acid, and then filtered. Water-soluble derivatives are extracted from the aqueous phase, after acidification, by means of usual extracting agents, for example chlorinated hydrocarbons, ethers or esters, and purified by recrystallization. The compounds having substituents of a low molar weight may even be distilled in vacuo.

It is especially interesting to obtain the oxathiazinones from isolated β-ketocarbamido-N-sulfofluoride in case the reaction proceeds inhomogenously. For economic reasons, an intermediate isolation of the β-ketocarbamido-N-sulfofluoride and its separate saponification will certainly be renounced to in most cases. Preferably, the crude reaction mixtures obtained according to one of the processes A to D will be directly and immediately saponified.

When starting according to process A with ketones and FSI, the components of the equation

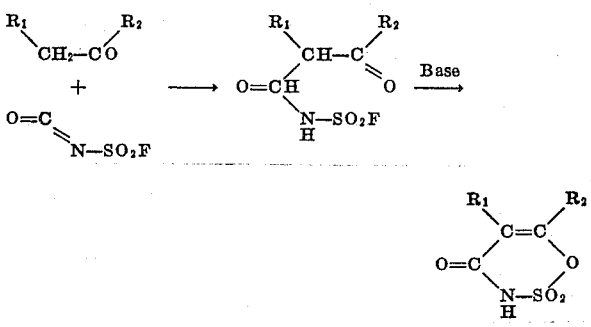

should be used in a molar ratio of 1:1. In case lower ketones are used, it may however, be advantageous to use the ketone simultaneously as diluent and to choose an about 1.1 to about 10 fold, preferably 2 to 5 fold, molar excess. On the other hand, also other liquids inert to FSI, for example hydrocarbons, halogenated hydrocarbons or ethers, may be used as diluents. The reaction proceeds at temperatures of from −30° to about +95° C, preferably of from +20° to +70° C, depending on the substituents $R_1$ and $R_2$, within several hours. For reasons of the sensitivity of FSI to water, any humidity should be excluded as far as possible. The course of the reaction may be observed by means of infrared spectrography (elimination of the isocyanate band of the FSI at 4.4μ).

The FSI affects only the α—CH$_2$ group adjacent to the carbonyl. In case there is only one such group, as in methyl- or phenylketones, a uniform product is obtained. A uniform reaction show also symmetric ketones, since they add only 1 mol of FSI. In all other cases mixtures of two isomers are obtained having the same interesting properties as the uniform product.

Sometimes the β-ketocarbamido-N-sulfofluoride obtained precipitates from the crude mixture and may be suction-filtered. Generally an excess of water is added to the total crude mixture, the batch is neutralized with one of the aforementioned bases, for example sodium hydroxide solution, and the saponification in order to form the oxathiazinone I is carried out at pH 5 to 12, preferably pH 7 to 9, by adding further base.

When starting according to process B with FSI and free β-ketocarboxylic acids, the reaction proceeds according to the following equation:

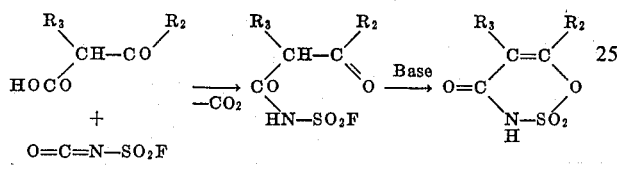

For reasons of the sensitivity of the β-keto-acids, an exothermic reaction in inert solvents, for example ethers, is recommended. The most favorable reaction temperature is from about −20° to about +10° C. The course of the reaction may be controlled by observation of the infrared band of the FSI at 4.4μ. On account of the difficulties in drying the ketocarboxylic acids, the FSI is advantageously used in a low molar excess.

After complete reaction, the mixture is subsequently saponified at pH 5 to 12, preferably at pH 7 to 9, with water with addition of a base to form the oxathiazinone, optionally after preliminary isolation of the β-ketocarboxylic acid amide-N-sulfofluoride.

When starting with β-diketones and FSI according to the process C for the preparation of the oxathiazinones, the β-ketocarboxylic acid amide-N-sulfofluorides are formed also in this case. However, the saponification of these compounds may result in obtaining two different products, as shown in the following equation:

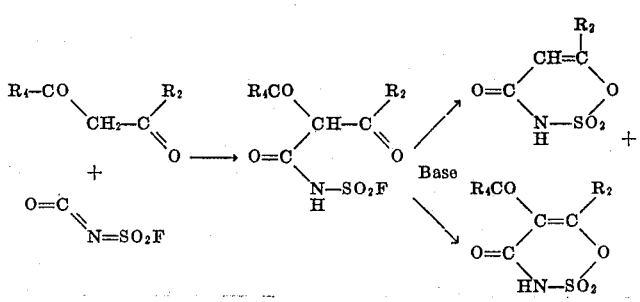

The addition of the FSI on the diketone is exothermic and is maintained in the most favorable temperature range of from about +10° to about +50° C by dilution with inert solvents, cooling and, optionally, slow addition of the FSI to the carbonyl compound.

The separation of the acid R$_4$COOH observed during the following saponification at pH 7 to 14 with water and three mols of base corresponds to the acid splitting of the β-dicarbonyl compounds. In the case of small radicals R$_2$ and R$_4$, this splitting generally is complete. In other cases, besides the oxathiazinone substituted in sixth position, its 5-acyl derivative is obtained simultaneously. If necessary, both these products may be separated by fractional crystallization.

According to process D, the oxathiazinones are obtained as is shown in the following reaction scheme:

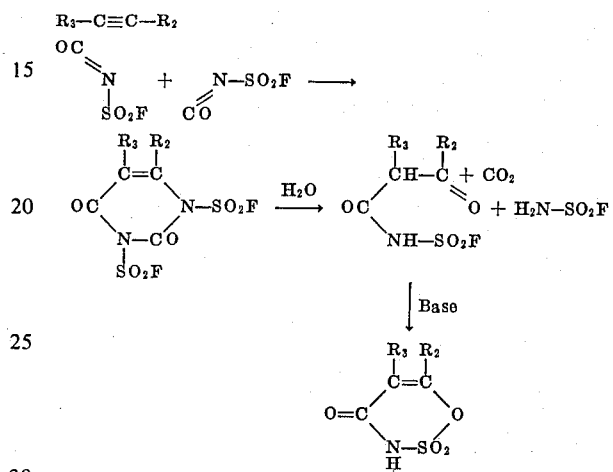

from acetylene derivatives with 2 equivalents of FSI via the stage of the uracil-N,N'-disulfofluorides. This new class of compounds is slowly forming when the components are combined in inert solvents, such as chlorinated hydrocarbons or acetonitrile. The reaction is carried out advantageously at temperatures of from about +10° to about +50° C and it is complete after a few days. In comparison with other uracil derivatives, the uracil-N,N'-disulfofluorides may be easily hydrolyzed and react with water in an acidic medium to form CO$_2$, amidosulfofluoride and β-ketocarboxylic acid amide-N-sulfofluorides, the saponification of which at pH 5 to 12, preferably 7 to 9, with the action of water and the addition of bases, yields the oxathiazinones. The hydrolysis may advantageously be carried out also in such a manner that the uracil is slowly combined with the base in the presence of water and preferably in the presence of dissolving agents, for example ethers, ketones, or esters. The preferred temperature range for hydrolysis is between about +10° and about +40° C. The oxathiazinone is obtained from the hydrolysate in known manner.

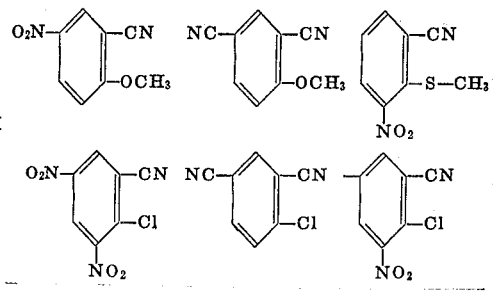

The FSI required for the preparation of the preliminary products of oxathiazinone may be obtained from chlorosulfonyl-isocyanate and NaF or HF according to German Pat. No. 1 043 293 or 1 083 791.

The new compounds are thermically and chemically stable crystalline substances which are soluble in usual organic solvents and, at low substitution degree, also in water. They are strong mono-basic acids — also the water-insoluble substances are soluble in dilute aqueous lyes — and form stable salts with organic and inorganic bases, for example ammonia, with primary, secondary and tertiary amines, for example triethanolamine. The salts with sodium, potassium, magnesium and calcium are thermically very stable compounds having melting points above 250° C, which easily dissolve in water reacting neutrally.

A great number of the new compounds has a sweet taste in the free acid form as well as in the form of their neutral salts. This sweetening effect is distinctive especially in the case of such compounds which, according to the general formula I, possess as substituent $R_1$ a hydrogen atom or an alkyl radical having up to four carbon atoms and as substituent $R_2$ an alkyl radical having up to four carbon atoms, $R_1$ and $R_2$ together possessing less than six carbon atoms. Some of these substances are distinguished by their especially pure sweetness without any metallic or bitter aftertaste. These compounds are the 6-methyl- and the 5,6-dimethyl-3,4-dihydro-1,2,3-oxathiazin-4-one-2,2-dioxide, both of which are about 200 fold sweeter than cane sugar, as well as the 5-ethyl-6-methyl-analogue which is about 500 fold sweeter than cane sugar. Since the free acids are not suitable in all cases because of their acidity, their non-toxic salts, especially the sodium, potassium and calcium salts are preferred as sweetening substances.

As such oxathiazinone-dioxides, the following examples may be cited:
6-methyl-,6-ethyl-, 6-propyl-,6-iso-propyl-,6-n-butyl-,6-isobutyl- and 6-tert.-butyl-3,4-dihydro-1,2,3-oxathiazin-4-one-2,2-dioxide, 5,6-dimethyl-, 5-methyl-6-ethyl-, 5-methyl-6-n-propyl-, 5-methyl-6-isopropyl- and 5-methyl-6-n-butyl-3,4-dihydro-1,2,3-oxathiazin-4-one-2,2-dioxide,
5-ethyl-6-methyl-, 5-ethyl-6-n-propyl-, 5-propyl-6-methyl-oxathiazin-4-one-2,2-dioxide.

Furthermore, the new compounds of formula I, on account of their polar properties, may be used as dissolving agents, and, inasmuch as the radicals $R_1$ and $R_2$ are alkyl radicals having a longer chain, these compounds are interfacial agents or surfactants and thus may be used as wetting, foaming or dispersing agents, emulsifiers etc. according to the kind of their substituents. For these purposes, above all the long-chain derivatives, preferably in the form of their alkali metal, alkaline earth metal or ammonium salts, especially as sodium salts, may be used.

Since the new ring system possesses a great number of reactive centers, for example the $SO_2$ group as ring forming element, the new compounds show a certain analogy to the derivatives of sulfuric acid, above all to the sulfonic acids, sulfonamides and sulfuric acid esters. This analogy is showing especially in the polar properties of the new compounds. From this analogy result also further special applications of the compounds, on the one hand as interfacial agents, on the other as intermediate products for organic syntheses, for example for the preparation of medicaments. On account of all other reactive groups of these new compounds, there is quite a number of further uses possible, as the expert will know.

The following examples illustrate the invention.

EXAMPLE 1

3,4-Dihydro-6-methyl-1,2,3-oxathiazin-4-one-2,2-dioxide.

a. A solution of 7.0 ml (88 mmols) of fluorosulfonyl-isocyanate (FSI) in 10 ml of absolute ether was added dropwise at 0° C to 8.2 g (78 mmols) of acetoacetic acid distilled in vacuo and diluted with 25 ml of dry ether. After distilling off the ether, 19 g of a yellowish oil were obtained. This oil was dissolved in 20 ml of water, and 60 ml of 4 N sodium hydroxide solution were added dropwise at 35°–40° C. After cooling and acidification with 25 ml of concentrated hydrochloric acid, extraction was carried out with ether and thus 7.0 g of colorless needles were obtained which, after recrystallization from chloroform or benzene, melted at 123–123 5° C. The yield of 3,4-dihydro-6-methyl 1,2,3-oxathiazin-4-one-2,2-dioxide was 55 percent of the theoretical yield.
$C_4H_5NO_4S$ (163,2) Calco: C 29,4 H 3,1 N 8,6 S 19,7
Found: 29,3 3,3 8,4 19,4
molar weight: 163 (mass spectrum)
Infrared spectrum ($CH_2CL_2$): 3,05 μ (NH), 5,83 and 5,93 μ (C=0),
6,06 μ (c=C), 7,1 and 8,3 μ ($SO_2$).

b. 80 ml (1 mol) of FSI were added dropwise, while stirring, to 300 ml of dry acetone at 30°–40° C. After the reaction was complete (infrared control), the excess acetone was distilled off in vacuo, and the orange colored residue was dissolved in 400 ml of icewater. Subsequently, 200 ml of 10.7 N sodium hydroxide solution were added dropwise, and the whole was allowed to stand for two hours. Acidification was carried out with 150 ml of concentrated hydrochloric acid, and a subsequent extraction with ether yielded 22 g (0.135 mol) of colorless clogged needles having a melting point of 123–123.5° C; yield: 13 percent.

The physical data are completely identical with those described under (a).

c. 80 ml (1 mol) of FSI were added dropwise at 30°–32 C, while stirring, to a solution of 103 ml (1 mol) of acetyl-acetone in 200 ml of absolute ether. The yellowish crystal pulp obtained yielded 185 g (84 percent) of yellowish crystals having a melting point of 112°–113° C (with decomposition).
$C_6H_8FNO_5S$ (225,2) Calc.: C 32,0 H 3,6 F 8,5 N 6,2 S 14,2
Found: 32,2 3,6 8,3 6,3 14,2

The product was suspended in 50 ml of water, 250 ml of 10.7 N sodium hydroxide solution were added slowly, and the whole was allowed to stand for 1 hour. Subsequently, it was acidified with 250 ml of concentrated hydrochloric acid, and completely extracted with methylene chloride. 65 g (0.4 mol) of fine, colorless needles, having a melting point of 123°–124° C, were obtained, which, according to their analysis, molar weight, NMR spectrum, mass spectrum, and mixed melting point, were identical with the substance described under (a). Yield: 40 percent.

EXAMPLE 2

3,4-Dihydro-6-n-butyl-1,2,3-oxathiazin-4-one-2,2-dioxide. A mixture of 500 ml of dry methylene chloride, 160 ml (2.0 mols) of FSI and 115 ml (1.0 mol) of hexyne-1 were allowed to stand for 3 weeks at room temperature. Subsequently, the methylene chloride was distilled off in vacuo. The oily residue was crystallized from 200 ml of absolute isopropyl ether at −70° C. 92 g (28 percent) of colorless needles having a melting point of 46°–47°C were obtained.

$C_8H_{10}F_2N_2O_6S_2$ (332,2) Calc.: C 28,9 H 3,0 F 11,4 N 8,4 S 19,3

Found: 29,1 3,0 11,6 8,4 19,2

Molar weight: 332 (mass spectrum)

Infrared spectrum ($CH_2Cl_2$): 5,6 and 5,7 $\mu$ (C=O)

6,05 $\mu$ (C=C).

33 g of the 6-n-butyl-uracil-N,N-di-sulfofluoride obtained (0.1 mol) were stirred with 200 ml of ether and 50 ml of water at room temperature, and 100 ml of 4 N NaOH were added dropwise within 20 minutes. The strongly alkaline mixture was allowed to stand for two hours, then acidified with 50 ml of concentrated HCl, and, by extraction with ether, 13 g of yellowish crystals were obtained which were easily recrystallized from propylchloride and then had a melting point of 62°–63° C. Yield: 10 g or 48 percent of the theoretical yield (at saponification).

$C_7H_{11}NO_4S$ (205,2) Calc.: C 41,0 H 5,4 N 6,8 S 15,6

Found: 40,8 5,3 6,9 15,7

Molar weight: 250 (mass spectrum)

Infrared spectrum ($CH_2Cl_2$): 3,05 $\mu$ (NH), 5,84 and 5,95 $\mu$ (C=O), 6,1 $\mu$ (C=C), 7,2 and 8,35 $\mu$ ($SO_2$).

EXAMPLE 3

3,4-Dihydro-6-phenyl-1,2,3-oxathiazin-4-one-2,2-dioxide. 25 g of FSI, dissolved in 50 ml of ether, were added dropwise to a solution of 32,5 g of benzoylacetone (0.2 mol) in 50 ml of diethyl ether, and the temperature was maintained at +30° C by cooling. After 30 minutes, 200 ml of water were added, and the solution was made alkaline(triazene indicator) by adding 100 ml of 5N NaOH. After the whole was allowed to stand for 60 minutes at room temperature, it was acidified with 5 N HCl, the precipitated product was extracted with ethyl acetate and, after elimination of the solvent, the residue (40 g = 88 percent of crude product yield) was separated into a more easily and a more sparingly soluble portion by recrystallization from toluene. After repeated recrystallizations of the more easily soluble portion, crystals were obtained which had a melting point of 180–181°C and a molar weight of 225 (mass spectrometry), the structure being proved by $H^1$—NMR spectrum.

Analysis $C_9H_7NO_4S$ Calc.: N 6,2 S 14,2

(225,2) Found: 6,5 13,8

The more sparingly soluble portion contained the 3,4-di-hydro-5-acetyl-6-phenyl-1,2,3-oxathiazine-4-one-2,2-dioxide, which was obtained in its pure form by recrystallization from toluene. Colorless crystals, melting point 164° C (decomposition), molar weight 267 (mass spectrum), structure proved by $H^1$—NMR.

Analysis $C_{11}H_9NO_5S$ Calc.: C 49,4 H 3,4 S 12,0

(267,3) Found: 49,2 3,4 11,9

EXAMPLE 4

3,4-dihydro-5,6-dimethyl-1,2,3-oxathiazin-4-one-2,2-dioxide.

a. 100 ml (1.2 mols) of butyne-1 and 160 ml (2 mols) of FSI were reacted for three days at 30°–35° C in 300 ml of dry methylene chloride. After concentration and crystallization at −70°C, 253 g = 83 percent of 4,5-dimethyl-uracil-N,N-disulfofluoride were isolated as colorless coarse crystals having a melting point of 108° C, which were recrystallized from methylene chloride and sublimated under highly reduced pressure.

$C_6H_6F_2H_2O_6S_2$ (304,3) Calc.: C 23,7 H 2,0 F 12,5 N 9,2 S 21,0

Found: 23,9 2,1 12,7 9,2 21,0 molar weight 304 (mass spectrum)

Infrared spectrum ($CH_2Cl_2$): 5,6 and 5,72 $\mu$ (C=O), 6,05 $\mu$ (C=C).

103 g (0.34 mol) of 4,5-dimethyl-uracil-N,N-disulfofluoride were suspended in 500 ml of ether and 200 ml of water and slowly combined within two hours with 280 ml of 5N NaOH at 25°–35° C while stirring thoroughly. Stirring was continued for another hour, and then 200 ml of concentrated HCl were added. Separation and repeated extraction with ether yielded 55 g (0.31 mol) or 91 percent of 3,4-dihydro-5,6-dimethyl-1,2,3-oxathiazin-4-one-2,2-dioxide having a melting point of 108, 5° C. This substance was sublimated in vacuo or recrystallized from a small amount of water or benzene/cyclohexane.

$C_5H_7NO_4S$ (177,2) Calc.: C 33,9 H 3,95 N 7,9 S 18,1

Found: 33,9 3,8 8,0 17,9 molar weight 177 (mass spectrum)

Infrared spectrum ($CH_2Cl_2$): 3,05 $\mu$ (NH), 5,85 and 5,95 $\mu$ (C=O), 6,05 $\mu$ (C=C); 7,1 and 8,3 $\mu$ ($SO_2$).

b. 40 ml of FSI (0.5 mol) were added dropwise to 180 ml (2 mols) of freshly distilled butanone-2 at 30°–35 C. The reaction was allowed to proceed for three hours. Non-converted butanone-2 was then distilled off in vacuo. 60 g (60 percent of the theoretical yield) of α-methyl-aceto-acetic acid amide-N-sulfofluoride were obtained as oily liquid. Recrystallization from propylchloride/ether with cooling yielded colorless crystals having a melting point of 44°–45° C.

$C_5H_8FNO_4S$ (197,2) Calc.: C 30,4 H 4,1 N 7,1 S 16,3

Found: 30,6 4,2 7,0 15,8 molar weight: 197 (mass spectrum)

Infrared spectrum ($CH_2Cl_2$): 5,7 and 5,85 $\mu$ (C=O)

50 g (0.25 mol) of α-methyl-aceto-acetic acid amide-N-sulfofluoride having a melting point of 44°–45° C were dissolved in 100 ml of water and combined, while cooling, with 175 ml of 4H NaOH. After the solution had been allowed to stand for two hours at room temperature, it was acidified with 90 ml of concentrated HCl and extracted with ether. 42.5 g of colorless crystalline 3,4-dihydro-5,6-dimethyl-1,2,3-oxathiazin-4-one-2,2-dioxide having a melting point of 105°–107° C were obtained. Yield: 95 percent of the theoretical yield (saponification).

c. The crude liquid reaction mixture prepared according to b) from butanone-2 and FSI was diluted, while cooling, with 200 ml of water after the excess butanone had been distilled off, and then 350 ml of 4H NaOH were added slowly. In order to separate impurities, the whole was extracted with ether and then acidified with 150 ml of concentrated HCl. The subsequent ether extraction yielded 40 g (45 percent) of 3,4-dihydro-5,6-dimethyl-1,2,3-oxathiain-4-one-2,2-dioxide having a melting point of 107°–108° C.

EXAMPLE 5

3,4-Dihydro-5-methyl-6-ethyl-1,2,3-oxathiazin-4-one-2,2-dioxide.

A mixture of 110 ml (1 mol) of pentanone-3, 150 ml of dry chloroform and 80 ml (1 mol) of FSI was stirred for two hours at reflux temperature (67° C), and then the solvent was distilled off in vacuo. The residue was dissolved in 200 ml of icewater, 230 ml of 10.7N NaOH were added dropwise at 30° C, and the reaction was allowed to proceed for a further 2 hours. The whole was then acidified with 200 ml of concentrated CHl, and 116 g (60 percent of the theoretical yield) of colorless crystals were obtained which had a melting point of 93.5°–94° C.

$C_6H_9NO_4S$ (191,2) Calc.: C 37,7 H 4,8 N 7,3 S 16,8
Found: 37,3 4,5 7,5 16,7
molar weight: 191 (mass spectrum)
IR spectrum ($CH_2Cl_2$): 3,05 $\mu$ (NH), 5,87 and 5,97 $\mu$ (C=0)
6,07 $\mu$ (C=C), 7,1 and 8,3 $\mu$ ($SO_2$).

EXAMPLE 6

3,4-Dihydro-5-methyl-6-phenyl-1,2,3-oxathiazin-4-one-2,2-dioxide.

13.4 g of propiophenone (0.1 mol) and 12.5 g of FSI (0.1 mol) were mixed and heated to 60° C for 5 hours. 50 ml each of diethyl ether and water were added, then 50 ml of 4N NaOH was added, and the whole was stirred for 30 minutes. The ether was evaporated and discarded, the aqueous phase was acidified with 20 ml of concentrated hydrochloric acid and evaporated to dryness in vacuo. From the residue, the oxathiazinone was extracted with methylene chloride, and, after recrystallization from toluene, 15 g (63 percent of the theoretical yield) of colorless crystals having a melting point of 123° C and a molar weight of 239 (mass spectrum) were obtained.

Analysis $C_{10}H_9NO_4S$ Calc.: C 50,2 H 3,8 N 5,9 S 13,4
(239,3) Found: 50,4 3,8 5,9 13,2

EXAMPLE 7

3,4-Dihydro-5-ethyl-6-methyl-1,2,3-oxathiazin-4-one-2,2-dioxide.

At reflux temperature (46°–48° C), 80 ml (1 mol) of FSI were added dropwise to a solution of 110 ml (1 mol) of fractionated pentanone-2 in 200 ml of n-propylchloride, and the reaction was allowed to continue for another hour. The solvent was distilled off in vacuo, and the residue was dissolved in water while cooling. Subsequently, 200 ml of 10.7N NaOH was added dropwise within 30 minutes, stirring was continued for another hour at about 30° C, impurities were extracted with ether, and the product was acidified with 150 ml of concentrated HCl. The precipitated heavy oil was separated, and the aqueous phase was extracted with methylene chloride. After distilling off the solvent, this phase was combined with the oily crude product, which crystallized while standing. The crude product (68 g or 35 percent of the theoretical yield) crystallized from propyl chloride in coarse colorless crystals having a melting point of 101°–102° C.

$C_6H_9NO_4S$ (191,2) Calc.: C 37,7 H 4,8 N 7,3 S 16,8
Found: 37,5 4,7 7,6 16,7
Molar weight: 191 (mass spectrum)
IR spectrum ($CH_2Cl_2$): 3,05 $\mu$ (NH), 5,88 and 5,98 $\mu$ (C=0)
6,08 $\mu$ (C=C), 7,2 and 8,3 $\mu$ ($SO_2$)

EXAMPLE 8a 3,4-Dihydro-5-n-propyl-6-methyl-1,2,3-oxathiazin-4-one-2,2-dioxide.

250 ml (about 2 mols) of 95 percent hexanone-2 were stirred at 30°–35° C, and 40 ml (0.5 mol) of FSI were added dropwise within one hour and a half. Stirring was continued for another hour, and the reaction mixture was then poured into 100 ml of ice-water. 350 ml of 4N NaOH were added dropwise, thereby obtaining a final pH of 11.6. Stirring was continued for 2 hours at room temperature, the precipitated hexanone was separated, an extraction was carried out with ether and the alkaline water phase was acidified with 150 ml of concentrated HCl. Extraction with ether yielded 70 g of brownish crystal pulp, from which, by recrystallization with propyl chloride, 52 g of colorless crystals (50 percent of the theoretical yield) having a melting point of 96°–96.5° C were obtained.

$C_7H_{11}NO_4S$ (205,2) Calc.: C 41,0 H 5,4 N 6,8 S 15,6
Found: 41,3 5,4 6,6 15,5
Molar weight: 205 (mass spectrum)
IR spectrum ($CH_2Cl_2$): 3,05 $\mu$ (NH), 5,88 and 5,98 $\mu$ (C=0),
6,07 $\mu$ (C=C), 7,2 and 8,3 $\mu$ ($SO_2$).

EXAMPLE 8b 3,4-Dihydro-5-isopropyl-6-methyl-1,2,3-oxathiazin-4-one-2,2-dioxide.

A mixture of 125 ml (1 mol) of methyl-isobutyl-ketone, 150 ml of dry chloroform and 80 ml (1 mol) of FSI were heated for two hours at 60°–65° C, and the whole was worked up as described in Example 5. 80 g of slightly sticky crystals were obtained which after recrystallization from propylchloride, melted at 113°–114° C. Yield: 71 g or 35 percent of the theoretical yield.

$C_7H_{11}NO_4S$ (205,2) Calc.: C 41,0 H 5,4 N 6,8 S 15,6
Found: 40,9 5,4 7,2 15,4
Molar weight: 205 (mass spectrum)
IR spectrum ($CH_2Cl_2$): 3,05 $\mu$ (NH), 5,86 and 5,97 $\mu$ (C=0),
6,1 $\mu$ (C=C), 7,2 and 8,3 $\mu$ ($SO_2$).

EXAMPLE 9

3,4-Dihydro-5-n-octyl-6-methyl-1,2,3-oxathiazin-4-one-2,2-dioxide.

A mixture of 110 ml of 93 percent undecanone-2 (0.5 mol), 100 ml of chloroform and 40 ml (0.5 mol) of FSI were refluxed for one hour at 70° C, then the solvent was distilled off in vacuo. The oily residue was introduced into 250 ml of icewater, subsequently 130 ml of 10.7N NaOH were added dropwise at 30° C, and stirring was continued for another two hours. After acidification with 130 ml of concentrated HCl 100 g of a brownish oil were isolated by extraction with $CH_2Cl_2$, from which about 20 g of starting ketone were distilled off by heating up to 125° C of bath temperature under highly reduced pressure ($10^{-3}$ torr). The distillation residue was solidifying to crystals when cooling and was crystallized from propylchloride to yield a colorless product. Yield: 72 g (52 percent of the theoretical yield), melting point: 57°–58° C.
$C_{12}H_{21}NO_4S$ (275,4) Calc. C 52,3 H 7,7 N 5,1 S 11,7
Found 52,4 7,7 5,0 11,6
Molar weight: 275 (mass spectrum)
IR spectrum ($CH_2Cl_2$): 3,05 $\mu$ (NH), 5,85 and 5,9 $\mu$ (C=O),
6,1 $\mu$ (C=C), 7,2 and 8,3 $\mu$ ($SO_2$).

EXAMPLE 10

3,4-Dihydro-6-methyl-5-phenyl-1,2,3-oxathiazin-4-one-2,2-dioxide. 13.4 g of phenylacetone (0.1 mol) and 12.5 g of FSI (0.1 mol) were combined in 20 ml of diethyl ether and refluxed for 5 hours. 50 ml of water were added, then 50 ml of 4N NaOH, and the whole was stirred for 15 minutes. The ether phase was separated and discarded, the aqueous layer was acidified with 20 ml of concentrated hydrochloric acid and evaporated to dryness in vacuo. The oxathiazinone was extracted from the residue with chloroform. After recrystallization from toluene, 16 g (67 percent of the theoretical yield) of colorless crystals having a melting point of 145° C and a molar weight (mass spectrum) of 239 were obtained.
Analysis: $C_{10}H_9NO_4S$ Calc.: C 50,2 H 3,8 N 5,9 S 13,4
(239,3) Found: 50,1 3,9 5,8 13,2

EXAMPLE 11

3,4-Dihydro-5-ethyl-6-n-propyl-1,2,3-oxathiazin-4-one-2,2-dioxide.

A mixture of 140 ml of 94 percent heptanone-4 (1 mol), 100 ml of dry chloroform and 80 ml (1 mol) of FSI was heated for 4 hours at 55°–60° C and then stirred into 200 ml of icewater. Subsequently, 200 ml of 10.7N NaOH were added and the whole was allowed to react for 2 hours at 30°–35° C. Possible impurities were extracted with chloroform, and the aqueous-alkaline solution was then acidified with 150 ml of concentrated CHl. The precipitated crystal pulp (110 g) was recrystallized from propylchloride, while cooling, and 95 g of colorless crystals having a melting point of 85°–86 C were obtained. Yield: 43 percent.
$C_8H_{13}NO_4S$ (219,3) Calc.: C 43,8 H 6,0 N 6,4 S 14,6
Found: 43,9 6,0 6,3 14,2
Molar weight: 219 (mass spectrum)
IR spectrum ($CH_2Cl_2$): 3,05 $\mu$ (NH), 5,86 and 5,97 $\mu$ (C=O)
6,1 $\mu$ C=C), 7,1 and 8,3 $\mu$ ($SO_2$).

EXAMPLE 12

3,4-Dihydro-5-n-propyl-6-n-butyl-1,2,3-oxathiazin-4-one-2,2-dioxide.

86 ml (0.5 mol) of nonanone-5, 80 ml of chloroform and 40 ml of FSI (0.5 mol) were reacted at 60°–65° C for 2 ½ hours, the whole was then saponified with 100 ml of icewater and 100 ml of 10.7N NaOH for 2 hours at 30°–35° C, and, after acidification with 75 ml of concentrated HCl, 79 g of hard crystal substance was isolated, which, after recrystallization from propylchloride, yielded 61 g of colorless needles having a melting point of 46°–47° C. Yield: 49 percent of the theoretical yield.
$C_{10}H_{17}NO_4S$ (247,3) Calc.: C 48,5 H 6,9 N 5,7 S 13,0
Found: 48,3 6,9 5,8 13,0
Molar weight: 247 (mass spectrum)
IR spectrum ($CH_2Cl_2$): 3,05 $\mu$ (NH), 5,86 and 5,96 $\mu$ (C=O),
6,1$\mu$ C=C), 7,1 and 8,35 $\mu$ ($SO_2$)

EXAMPLE 13

3,4-Dihydro-5-n-butyl-6-n-amyl-1,2,3-oxathiazin-4-one-2,2-dioxide.

105 ml (0.5 mol) of undecanone-6 (99 percent), 80 ml of chloroform and 40 ml (0.5 mol) of FSI were mixed and worked up as described in Example 12. As crude product, 81 g of a brownish oil was isolated, which, after dissolution in propylchloride and cooling, yielded colorless crystals having a melting point of 34°–35 C. Yield: 59 g (43 percent of the theoretical yield).
$C_{12}H_{21}NO_4S$ (275,4)
Molar weight: 275 (mass spectrum)
IR spectrum ($CH_2Cl_2$): 3,05 $\mu$ (NH), 5,86 and 5,96 $\mu$ (C=O),
6,1 $\mu$ (C=C), 7,1 and 8,35 $\mu$ ($SO_2$)

EXAMPLE 14

3,4-Dihydro-5,6-tetramethylene-1,2,3-oxathiazin-4-one-2,2-dioxide.

80 ml of FSI (one mol) were added dropwise at 50° C to a solution of 110 ml (about one mol) of cyclohexanone in 150 ml of n-propylchloride, and the solvent was then distilled off in vacuo. The orange viscous residue was introduced into 200 ml of icewater, and 230 ml of 10.7N NaOH were added dropwise at 25°–30 ° C, which caused the crystallization of the sodium salt. Stirring was continued for another hour, impurities were then extracted with ether, and the aqueous phase was acidified with 200 ml of concentrated CHl. 125 g of fair crystals (61 percent) were isolated which, after recrystallization from toluene, had a melting point of 122°–123° C.
$C_7H_9NO_4S$ (203,2) Calc.: C 41,4 H 4,5 N 6,9 S 15,8
Found: 41,2 4,4 7,1 15,5
Molar weight: 203 (mass spectrum)
IR spectrum ($CH_2Cl_2$): 3,05 $\mu$ (NH), 5,88 and 5,9 $\mu$ (C=O).
6,05 $\mu$ (C=C), 7,2 and 8,35 $\mu$ ($SO_2$),

EXAMPLE 15

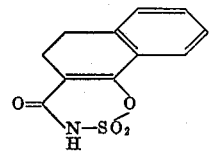

3,4-dihydro-5,6-[2,1-(3,4-dihydro-)naphtho]-1,2,3-oxathiazin-4-one-2,2-dioxide.

25.0 g (0.2 mol) of FSI were added within 15 minutes to 29.2 g of 1,2,3,4-tetrahydronaphthalone-(1) (0.2 mol) in 50 ml of boiling chloroform, and refluxing was continued for a further two hours. When concentrated, the tetralone-2-carboxylic acid amide-N-sulfofluoride crystallized in a not completely pure form (melting point 172° C). 80 ml of water were added and 100 ml of 4N NaOH After the solution had been allowed to stand for one hour at room temperature, the clear solution was extracted with methylene chloride, the aqueous phase was acidified with 40 ml of concentrated hydrochloric acid and the crystalline precipitate was collected on a suction-filter. After recrystallization from ethyl acetate 38 g (76 percent of the theoretical yield) of crystals having a melting point of 215°-216° C were obtained. A sample purified for analysis melted at 216°-217° C. Molar weight 251 (mass spectrum)
Analysis: $C_{11}H_9NO_4S$ Calc.: S 12,7
(251,3) Found: 12,5

We claim:
1. A compound of the formula

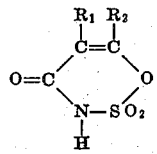

in which $R_1$ is hydrogen, alkyl of one to 20 carbon atoms, an aromatic hydrocarbon residue of up to 10 carbon atoms or alkanoyl of two to four carbon atoms, $R_2$ is alkyl of one to 20 carbon atoms or an aromatic hydrocarbon radical of up to 10 carbon atoms, and wherein $R_1$ and $R_2$ together with the carbon atoms to which they are bound form a carbocyclic ring of five to eight ring members, and its salts.

2. A compound as claimed in claim 1, wherein $R_1$ is hydrogen, alkyl of one to 10 carbon atoms, phenyl or alkanoyl of two to four carbon atoms, $R_2$ is alkyl of one to 10 carbon atoms or phenyl and $R_1$ and $R_2$ together are tetramethylene, and its salts.

3. A compound as claimed in claim 1, wherein $R_1$ is hydrogen or alkyl of one to four carbon atoms and $R_2$ is alkyl of one to four carbon atoms, the sum of the carbon atoms of $R_1$ and $R_2$ being less than six, and its non-toxic salts.

4. The compound as claimed in claim 1, wherein $R_1$ is hydrogen and $R_2$ is methyl, and its non-toxic salts.

5. The compound as claimed in claim 1, wherein $R_1$ and $R_2$ are methyl, and its non-toxic salts.

6. The compound as claimed in claim 1, wherein $R_1$ is ethyl and $R_2$ is methyl, and its non-toxic salts.

7. A process for the preparation of a compound of the formula

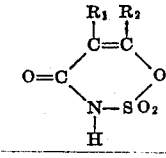

in which $R_1$ is hydrogen, alkyl of one to 20 carbon atoms, an aromatic hydrocarbon residue of up to 10 carbon atoms or alkanoyl of two to four carbon atoms, $R_2$ is alkyl of one to 20 carbon atoms or an aromatic hydrocarbon radical of up to 10 carbon atoms, and wherein $R_1$ and $R_2$ together with the carbon atoms to which they are bound form a carbocyclic ring of five to eight ring member, which comprises reacting a compound of the formula

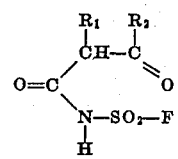

in which $R_1$ and $R_2$ are as defined above with an aqueous alkaline agent at a temperature of about +5° C to about +85° C and in a pH range of about 5 to about 12.

8. The process as claimed in claim 7, which comprises reacting a compound of the formula

$R_4CH_2a—CO—R_2$ in which $R_2$ is alkyl of one to 20 carbon atoms or an aromatic hydrocarbon residue of up to 10 carbon atoms and $R_4$ is hydrogen or a radical as defined for $R_2$, with fluoro sulfonyl isocyanate at a temperature of about −30° C to about +95° C and treating the so-obtained β-ketocarboxylic acid-N-sulfofluoride with an aqueous alkaline agent.

9. The process as claimed in claim 7, which comprises reacting a compound of the formula

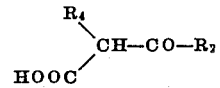

in which $R_2$ is alkyl of one to 20 carbon atoms or an aromatic hydrocarbon residue of up to 10 carbon atoms and $R_4$ is hydrogen or a radical as defined for $R_2$, with fluoro sulfonyl isocyanate at a temperature of about −20°C to about +10°C and treating the so-obtained β-ketocarboxylic acid-N-sulfofluoride with an aqueous alkaline agent.

10. The process as claimed in claim 7, which comprises reacting a compound of the formula

$R_3—CO—CH_2—CO—R_2$ in which $R_2$ is alkyl of one to 20 carbon atoms or an aromatic hydrocarbon residue of up to 10 carbon atoms and $R_3$ is alkyl of one to three carbon atoms, with fluoro sulfonyl isocyanate at a temperature of about +10°C to about +50°C and treating the so-obtained β-ketocarboxylic acid-N-sulfofluoride with an aqueous alkaline agent.

11. The process as claimed in claim 7, which comprises reacting a compound of the formula

$R_4—C ≡ C—R_2$ in which $R_2$ is alkyl of one to 20 carbon atoms or an aromatic hydrocarbon residue of up to 10 carbon atoms and $R_4$ is hydrogen or a radical as defined for $R_2$, with fluoro sulfonyl isocyanate at a temperature of about +10°C to +50°C and treating the so-obtained β-ketocarboxylic acid-N-sulfofluoride with an aqueous alkaline agent.

* * * * *

UNITED STATES PATENT OFFICE
CERTIFICATE OF CORRECTION

Patent No. 3,689,486　　　　　　　　　　Dated September 5, 1972

Inventor(s) Clauss et al.

It is certified that error appears in the above-identified patent and that said Letters Patent are hereby corrected as shown below:

In the Abstract: line 4, change "of" to -- or --.

Column 1, line 58, change "-C=C-" to -- -C≡C- --;

line 62, change "$SO_2$" to -- $SO_2F$ --;

Column 2, line 59, change "-C=C-" to -- -C≡C- --.

Column 3, line 5, in the structural formula, change

Column 3, line 10, in the structural formula, change "$R_5$" to -- $R_3$ --;

Column 4, line 46, in the structural formula, change "O=CH" to -- O=C --;

Column 5, lines 51 to 60, in the structural formulae, change each (3) occurence of "$R_4CO$" to -- $R_4\overset{O}{C}$ -- and change "O=C\\N=$SO_2F$" to ;

Column 6, lines 51 to 60, cancel all six structural formulae of CN-substituted benzenes;

Column 16, line 17, delete "a" after "$CH_2$";

lines 24, 39, 52 and 65, in each instance, after "acid" insert -- amide --;

line 57, change "$R_4$-C=C-$R_2$" to -- $R_4$-C≡C-$R_2$ --.

Signed and sealed this 21st day of January 1975.

(SEAL)
Attest:

McCOY M. GIBSON JR.　　　　　C. MARSHALL DANN
Attesting Officer　　　　　　Commissioner of Patents